United States Patent [19]  
Fehr et al.

[11] 4,091,669  
[45] May 30, 1978

[54] PRESSURE RESPONSIVE APPARATUS
[75] Inventors: Ivor John Martin Fehr, Basingstoke; Desmond Wheable, Overton, both of England
[73] Assignee: Bell & Howell Limited, Basingstoke, England
[21] Appl. No.: 740,791
[22] Filed: Nov. 11, 1976
[30] Foreign Application Priority Data
Nov. 18, 1975 United Kingdom ............... 47557/75
[51] Int. Cl.² ............................................. G01F 23/14
[52] U.S. Cl. ...................................................... 73/299
[58] Field of Search .................. 73/299, 302, 1 H, 4 R
[56] References Cited
U.S. PATENT DOCUMENTS

| 2,600,324 | 6/1952 | Rappaport | 73/4 R X |
| 2,696,738 | 12/1954 | Lupfer | 73/299 |
| 2,791,906 | 5/1957 | Vetter | 73/299 X |
| 3,049,148 | 8/1962 | Richardson | 73/4 R X |
| 3,394,590 | 7/1968 | Napolitano | 73/299 |
| 3,610,042 | 10/1971 | Brosius, Jr. | 73/299 |
| 3,969,941 | 7/1976 | Rapp | 73/299 X |

Primary Examiner—Richard C. Queisser  
Assistant Examiner—Joseph W. Roskos  
Attorney, Agent, or Firm—Richard L. Myers

[57] ABSTRACT

Apparatus suitable for use as a hydrostatic pressure standard comprises a vertically-mounted container charged with a predetermined amount of a liquid having a low-vapor pressure, such as an hydraulic oil, to provide a predetermined pressure head at a port at the lower end of the container. The container is provided at its upper end with a closure in the form of a variable volume device which is so arranged that the pressure in the space within the container above the liquid is maintained substantially equal to the external, e.g. atmospheric pressure. A system for determining the mass of a liquid in a tank and embodying two such pressure standards is also described.

24 Claims, 4 Drawing Figures

PRESSURE RESPONSIVE APPARATUS

FIELD OF THE INVENTION

This invention relates to apparatus suitable for use as a hydrostatic pressure standard, and pressure responsive systems embodying such apparatus.

DESCRIPTION OF THE PRIOR ART

Because of the recent rises in the cost of oil products, their relative value has risen dramatically. Consequently, the need has arisen for very much more accurate measurement of oil stocks than was previously required.

Existing methods of determining the content of very large liquid tanks are based on level measurment. This is an inherently inaccurate means of measurement because the level varies with temperature as the fluid expands. To determine the absolute fluid quantity, this level measurement must be converted to mass, which requires also the simultaneous measurement of the fluid temperature and specific gravity, taking account of variations in these parameters throughout the fluid body. Thus three sources of error are introduced in addition to those in tank geometry.

A typical level measurement system is dependent upon a liquid surface sensing device whose position is commonly determined by measuring the length of a supporting wire, using a servo system to control the wire length or tension. Other methods are in use but are generally less accurate. Such servo controlled systems are complex and prone to breakdown and have many internal sources of error. In addition, changes in the specific gravity or dielectric constant of the fluid may affect the accuracy of the surface sensing device.

Pressure measurement provides a means of determining the mass of fluid independently of the temperature and specific gravity of the fluid, or variations in these. The pressure is multiplied by the tank area to give mass content, which can be automatically compensated for variations in tank geometry due to bulging under pressure, thermal expansion and internal irregularities. Thus, given an accurate pressure transducer measurement accuracies can be achieved which are far greater than those obtainable with level measurement.

However, the existing transducer technology does not allow for a sufficiently accurate and stable transducer to achieve the required accuracy.

A proposed system embodying the present invention seeks to reduce substantially or eliminate virtually all transducer errors by calibration and compensation. The system is also designed for minimal maintenance, other than periodic calibration, since the only moving part is a tank.

SUMMARY OF THE INVENTION

According to the invention there is provided apparatus suitable for use as a pressure standard, comprising a container arranged, in use, to have a predetermined orientation and to be charged with a liquid whereby the pressure at a port in the lower part of the container is at a predetermined value, and wherein the container is sealed at an upper part by a closure member so arranged that pressure within the container in the space above the liquid is maintained substantially equal to the external pressure. In a preferred embodiment, the closure member is a variable volume device so arranged that the pressure within the space above the liquid and exerted on one side of the closure member from within the container is maintained substantially equal to the external pressure on the other side of the closure member.

Further, according to the invention there is provided apparatus suitable for use as a hydrostatic pressure standard comprising a container arranged, in use, to be mounted with a predetermined orientation and to be charged with a predetermined mass of liquid to provide a predetermined pressure head at a port at or near its lower end, and sealed at its open, upper end by a closure member which is so arranged that a change in the volume of the space above the liquid within the container does not substantially affect the hydrostatic pressure at said port.

The container is preferably tubular, and, in use, is so mounted that its axis has a substantial vertical component.

Preferably the container has a constant cross-sectional area, or an accurately known volume and length to give a required reference pressure.

The closure member may be of a thin, flexible material such as polyurethane and in one embodiment is in the form of a floppy bag made of polyurethane about 0.002 inches thick.

The container may be so formed that, in use, its open, upper end which is sealed by the closure member is turned through an angle of at least 90° to the vertical and is preferably directed substantially vertically downwardly.

The apparatus can be used as a hydrostatic pressure standard in a pressure-measuring or responsive system. Such a system may be arranged to measure the hydrostatic pressure head of a liquid in a tank by means of a pressure transducer which is calibrated, or has its calibration checked, by sensing the standard pressure provided by the said apparatus.

In a preferred system two such apparatuses may be provided, one to provide the standard pressure reference at or near to the maximum value of pressure to be sensed by the transducer and another to provide a standard pressure reference at or near to the minimum value of pressure to be sensed by the transducer.

If the dimensions of the tank are known then it is possible to determine the mass of the liquid in the tank from a knowledge of the pressure and the said dimensions.

Such mass determination may be achieved by means of a computer, such as one known as a polynomial microcomputer PM16 Series sold by Bell and Howell Limited, or one as disclosed and claimed in the Specifications of British Patent No. 1,363,073 (U.S. Pat. No. 3,789,203) or our co-pending British Patent Applications Nos. 8045/75 and 8134/75 (U.S. Patent Application No. 658,349).

BRIEF DESCRIPTION OF THE DRAWINGS

The invention will now be described by way of example with reference to the accompanying drawings, in which.

Figure 1:
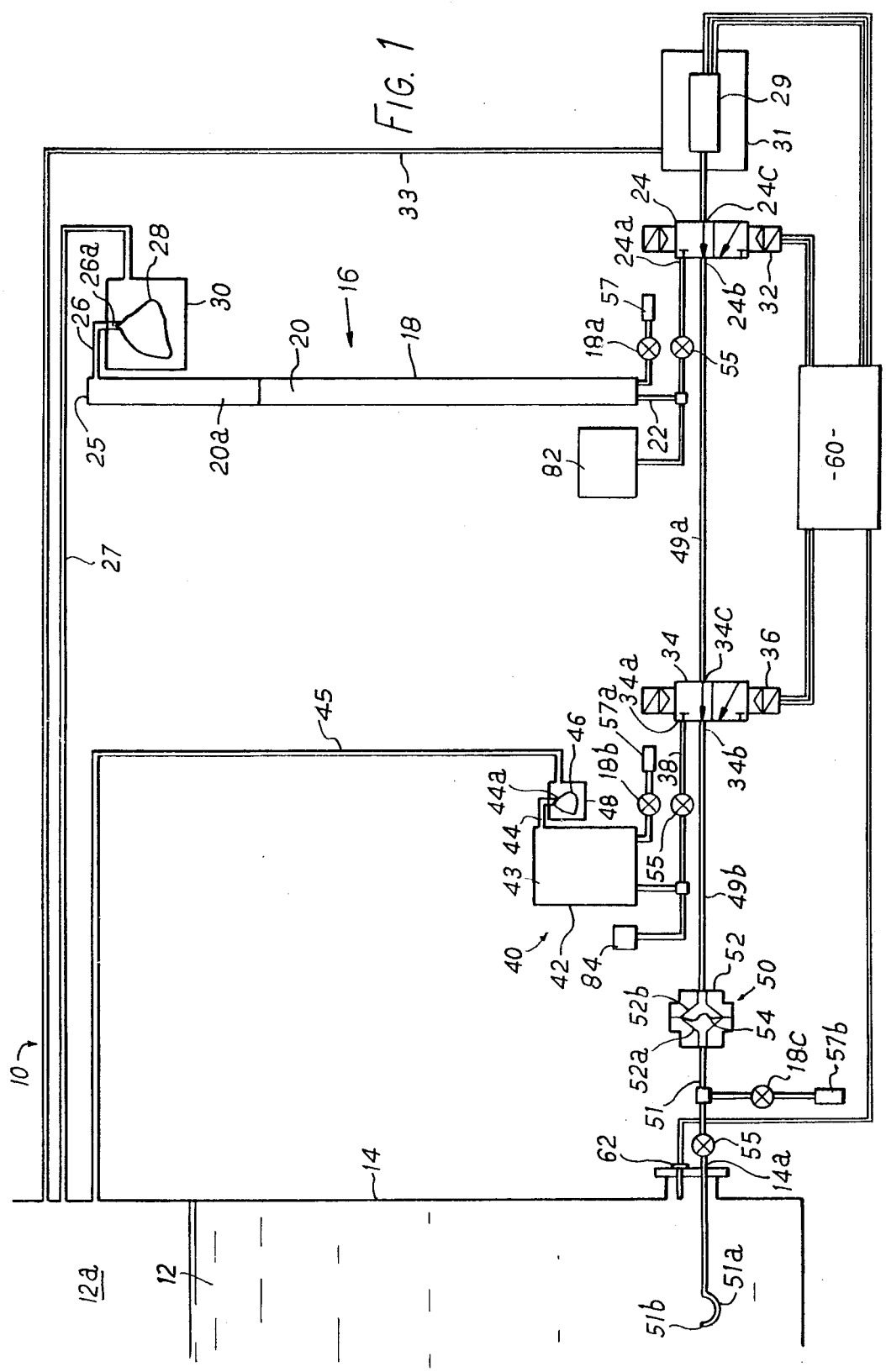
FIG. 1 shows a block diagram of a part of a system for determining the mass of a liquid in a tank, embodying apparatus according to the invention.
Figure 2:
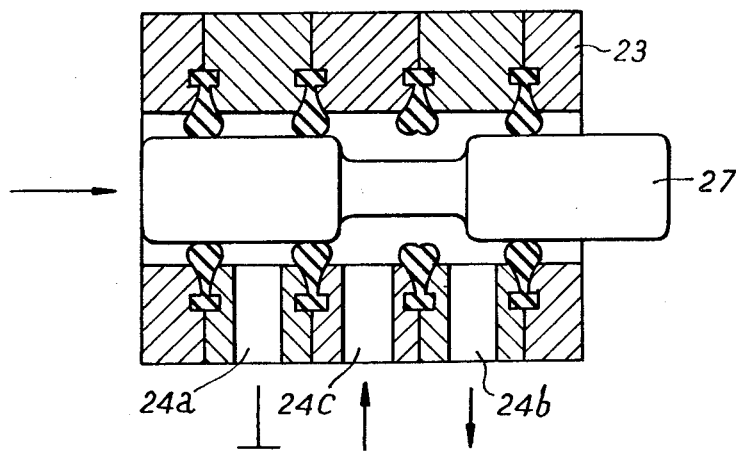
FIGS. 2 and 3 show a spool valve for use in the system according to FIG. 1 in the de-energised and energised positions respectively.
Figure 3:
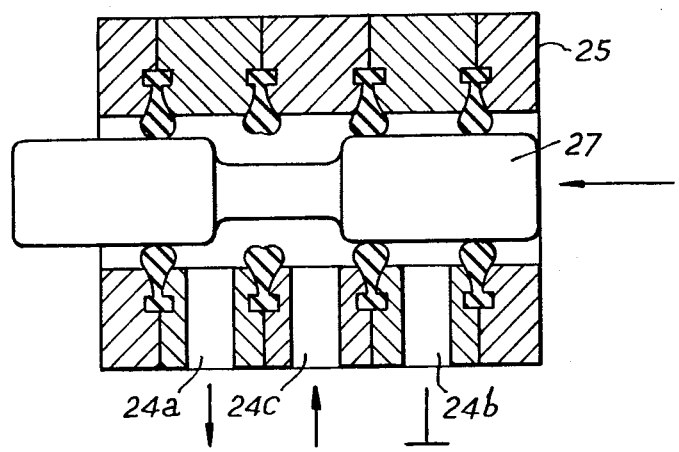
Figure 4:
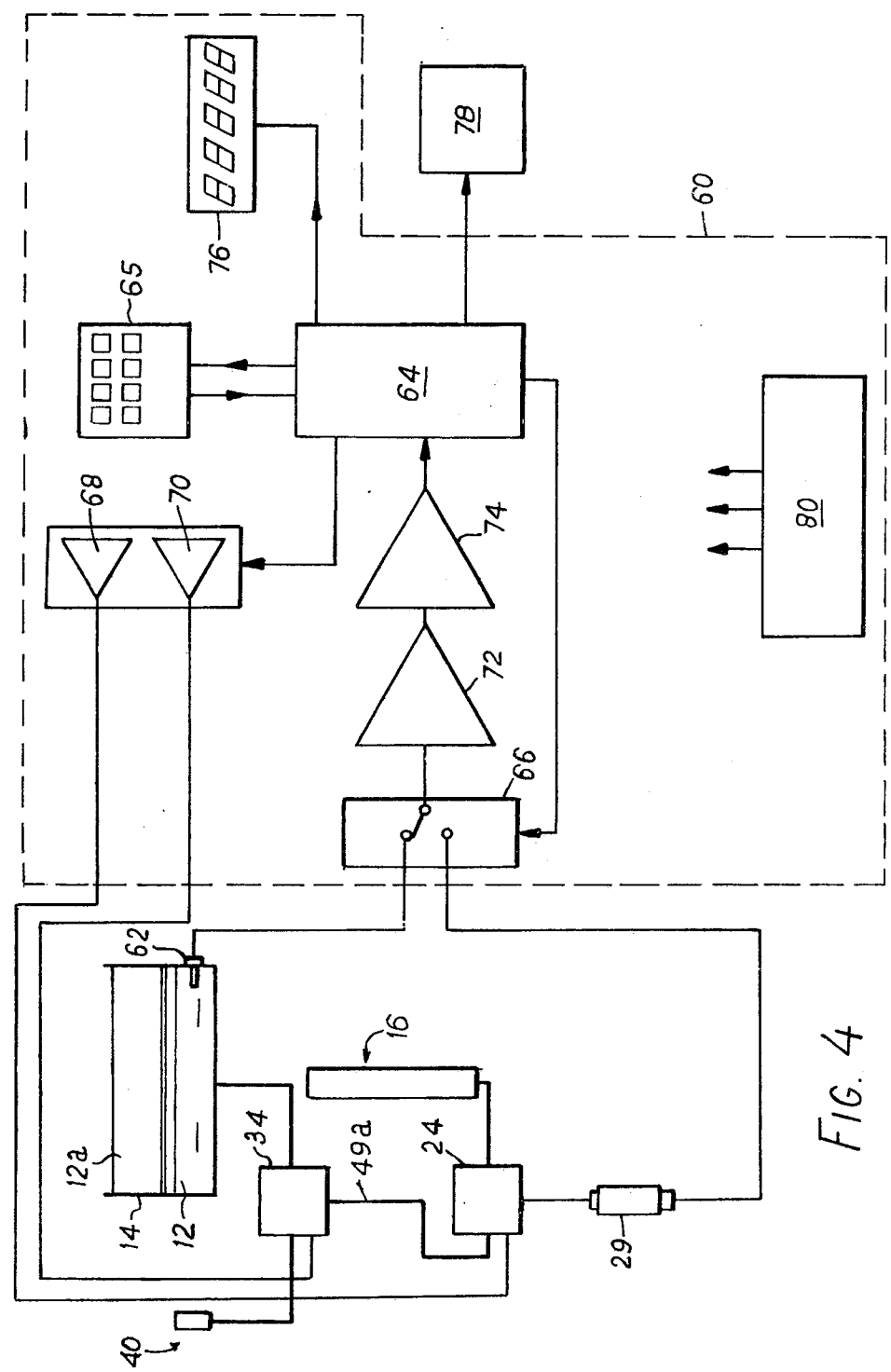
FIG. 4 shows a general block diagram of the system of FIG. 1 with part of its control apparatus in greater detail.

Referring to the drawings, there is shown a system 10 for determining the mass of a liquid 12 contained in a tank shown in part at 14. The system embodies a first hydrostatic pressure standard 16 comprising a right-circular cylindrical, steel container 18 mounted vertically, in use, adjacent the tank 14, such that there can be no relative vertical movement between them. The container 18 is charged with a predetermined mass of a suitable liquid 20 having a low evaporation rate such as a hydraulic oil. The lower end of the container 18 is coupled by way of a small-bore tube 22 to a port 24a of a spool valve 24. The upper end of the container 18 is closed by a cap 25 which may be welded but is preferably screwed thereto to facilitate charging thereof. Extending outwardly from the upper end of the container 18 is a small-bore tube 26 which is formed with a right-angled bend so that its open end 26a, remote from the container 18, is directed downwardly. The open end 26a is sealed by means of a floppy bag 28 of a suitable thin flexible material, such as polyurethane about 0.002 inches thick. The end of the tube 26 and the bag 28 are protected by a closed, rigid box 30 secured to the tube 26, the box 30 being vented to the space 12a above the liquid 12 in the tank 14 by way of a tube 27. Charging and calibration of the pressure standard 16 will be described hereinafter but it may be explained here that the purpose of the bag 28 is to reduce or prevent changes in the pressure head due to the liquid 20 because of condensation or evaporation of the liquid or direct ingress of water or other substance through tube 26. Because of the nature of the bag it will be realised that its internal volume will vary to maintain the total pressure within the space above the liquid within the container substantially equal to the pressure within the rigid box 30.

The spool valve 24 has further ports 24b and 24c and, as shown, comprises a hollow body 23 with a spool 27 having a shape of a dumbell slideable therein to connect together ports 24a and 24c or ports 24b and 24c. Ports 24a and 24b cannot be connected together. The spool 27 is operated by a solenoid 32. The port 24c is connected to a pressure-responsive transducer 29 such as a strain-gauge transducer sold by Bell & Howell Limited under the type No. 4-326 and the port 24b is connected by way of a pipe 49a to a port 34c of a similar spool valve 34 operated by a solenoid 36. The transducer 29 is provided with an airtight cover 31 which is vented to the space 12a above the liquid 12 in the tank by way of a tube 33.

The port 34a of spool valve 34 is connected by way of a pipe 38 to a port in the lower end of a second pressure standard 40, similar in concept but differing in dimensions to that of the first, high-pressure standard 16; that is, it comprises a right-circular cylindrical, steel container 42 mounted with its axis vertical. The upper end of tube 42 is closed by a cap 43 and extending outwardly from the upper end is a relatively small-bore tube 44 which is formed with a right-angled bend such that its open end 44a remote from container 42 is directed downwardly. The end 44a is sealed by means of a floppy bag 46 of a suitable thin and flexible material. As before, a closed, rigid box 48 is provided to protect the bag 46 and end 44a of the tube, the box 48 being vented to the space 12a within the tank 14 by way of a tube 45. The vent tubes 27, 33 and 45 are connected to the air space 12a at the top of the product tank 14 for two purposes; firstly they eliminate transients due to varying wind conditions at the transducer 29 and at the top of the reference columns 18 and 42; secondly they ensure that all of the pressure sensitive components are referred to the top of the product tank and compensate for a possible elevated pressure above the product 12. This is not essential but does improve stability and accuracy.

The port 34b of the spool valve 34 is coupled through a port 14a in the tank 14 by way of a pipe 49b, an isolating device 50 and a pipe 51 respectively. The pipe 51 extends approximately 1 meter into the tank to reach the theoretical mean temperature point at that level. It also has a bend 51a to point the tube end 51b upwardly so that draining the tank below the transducer level does not drain any part of the pipework. If necessary the product contained in the pipework 51 can be changed by bleeding via valve 18c. The device 50 comprises a rigid box like container 52 divided into two compartments 52a, 52b by a floppy diaphragm 54 of a suitable material, such as polyurethane, having a very low stiffness. The internal walls of the container 52 are shaped to provide a supporting surface for the diaphragm 54 to prevent rupture of the diaphragm 54 in the event of a leak in pipe 49, for example.

The liquid in the pipe 51 will be the liquid in the tank 14, whereas the liquid in the pipes 22, 38, 49a and 49b is hydraulic oil as used in the pressure standards 16 and 40.

The pressure of the oil in pipe 49b will be substantially equal to the pressure head of the liquid in tank 14, while the pressure of the oil in pipes 22 and 38 will be equal to the pressures provided by the standards 14 and 40 respectively. Thus, by suitable energization of the solenoids 32 and 36 the transducer can be selectively exposed to the three different pressures. For example, if both solenoids are de-energized, then the transducer 29 is exposed to the pressure of the liquid in tank 14 by way of ports 24c, 24b, 34c and 34b. If the solenoid 32 is energized then the transducer 29 is connected to the high pressure head of apparatus 16 by way of ports 24c and 24a. If solenoid 36 only is energized then the transducer 29 is connected to the low pressure head of apparatus 40 by way of ports 24c, 24b, 34c and 34a.

Isolation valves 55 are provided in the pipelines at various positions to isolate parts of the system as and when necessary, during maintanence for example.

Before use, the high-pressure head apparatus 16 is charged with a predetermined mass of hydraulic oil 20 to provide a pressure-head approaching the maximum pressure to be measured by transducer 29, which corresponds to the pressure exerted by a tank 14 full of liquid 12 to be monitored. The diameter of the tube 18 is such that the volume of the head is large enough to allow for sufficient calibration cycles for a 3 month period. The main factors considered in deducing this volume are the compressibility of the oil contained within spool valve 24, the transducer 29 and any associated pipework between the two, plus the volume displacement of the transducer. Consider the situation where the tank 14 is nearly empty. Connection of the pressure transducer 29 to the high-pressure head 16 will cause a compression of the contained oil and a deflection of the transducer diaphragm. The consequent change in volume will be furnished by the oil in the high-pressure head 16 and this will be transferred away when spool valve 24 is operated. It is therefore essential that the transducer 29 used as a transfer standard has a low volume displacement. Also, as stated above, it is necessary for the volume of the high-pressure head 16 to be large enough so as to sufficiently swamp the effect of this loss of oil. The high-pressure head apparatus 16 is calibrated using a precision dead-weight tester (not shown). The dead weight tester is connected to the head 16 by way of a micro-manometer and an air/oil interface (not shown), a self-sealing, quick-release coupling 57 and a low displacement cock 18a. The micro-manometer is provided to improve the resolution of the calibration system to the order of 0.001 inches of water. The air/oil interface is necessary since the micro-manometer and dead weight tester use air as the working fluid and also to maintain the datum levels correctly during calibration. The head of liquid is adjusted using a syringe to inject or extract liquid by way of connection on the air/oil interface tube. Alternatively, the head of liquid 20 could be adjusted by a small piston with a fine thread adjustment. The low pressure head apparatus 40 is calibrated, if provided with a liquid, in a similar manner using a precision dead weight tester (not shown) coupled to the bottom of container 42 by way of a self-sealing, quick-release coupling 57a and a valve 18b as shown. Changes in height due to condensation, evaporation and direct ingress of water, are guarded against by the use of the flexible bags 28, 46 fitted over the open end of the pipes 26 and 24 respectively.

The pressure transducer 29 can be automatically calibrated against the reference pressures provided by apparatuses 16 and 40 and then used as a transfer standard, enabling a reduction in errors due to long-term drift, thermal stability and hysteresis to negligible proportions.

The output of the transducer 29 could be measured and then the pressures obtained from a calibration chart but this can be time-consuming, inconvenient and liable to introduce errors. The output of the transducer 29 is therefore connected to a data-processing apparatus 60, comprising computing apparatus 64 such as a microcomputer type PM-16 sold by Bell & Howell Limited having a keyboard 65 for providing some operator control thereto, and arranged to perform all the necessary calculations to determine the mass of liquid 12 in the tank 14. For example, the computing apparatus 64 will be arranged to store in suitable form values corresponding to the output signal of the transducer 29 against pressure (its calibration curve), a program for compensating for changes in the transducer output when compared with the standard pressures provided by apparatuses 16 and 40, the dimensions of the tank 14 to compute the mass of fluid 12 from its pressure head and the said dimensions. The apparatus 60 also indicates means for controlling operation of the system so that it makes a measurement automatically at set intervals or times, or under command of an external control system.

The transducer output is fed by way of a multiplexer 66 in apparatus 60 to the microcomputer 64. On command for information the transducer 29 is automatically connected to the high-pressure head 16, to the low-pressure head 40 and to the tank 14 in the correct sequence, the solenoids 32, 36 of valves 24, 34 being controlled by actuators 68, 70 respectively, which are in turn controlled by the microcomputer 64. The apparatus 60 uses the three pieces of information gained to correct for sensitivity and/or zero changes in the output of the transducer 29, and then accurately determines the hydrostatic pressure head of the liquid 12 in the tank 14. By correct sequencing of the spool valves 24, 34, hysteresis errors of the transducer 29 are removed or at least substantially reduced.

The multiplexer 66 is arranged to interrogate other parameters as necessary (such as tank 14 temperature by means of a temperature sensor 62). The mass calculations performed by apparatus 60 take into account variations due to tank swelling caused by hydrostatic pressure and shell temperature.

The apparatus 60 comprises two main parts, the interface electronics and a microcomputer 64. The interface will send control signals from actuators 68, 70 to the solenoids 32, 36 of the spool valves 24, 34, take the signals, via multiplexer 66, from the temperature sensor 62 and pressure transducer 29, amplify them in an amplifier 72 to a level suitable for conversion by an analogue to digital converter 74. Thus the analogue signals are converted to a digital form suitable for processing by the microcomputer 64 for display on an indicator 76 or print-out on a printer 78 or both. The electrical supply for the system is provided by a power supply 80.

Thermal compensation is provided for each pressure standard 16, 40. Compensation for pressure standard 16 is provided by means of container 82 connected in parallel with the reference head 16 as shown. The volume of container 82 is calculated such that the thermal expansion of the oil contained in it (allowing for the container expansion) matches the thermal expansion of the reference head tube 18. Assuming that the compensation volume is at the same temperature as the reference head, as the reference head expands the compensation volume will inject the correct quantity of oil to make up for the fall in reference head level so caused. A similar compensation container 84 is provided for low-pressure standard 40. The compensation volume could be incorporated directly into the reference head either by extending the reference head downwardly below the datum level or by fattening the base of the column. The compensation volume could also be modified to allow for "horizontal volume" contained in the connecting pipe work.

The transducer 29 should be sited as close as possible to the high-pressure head 16. This is to keep the volume of the horizontal pipework within the measuring system to a minimum as change in volume of the oil contained in this "horizontal volume" (say, due to temperature) can only be accommodated by a change in level in the vertical column. This will result in a direct error but can be kept to negligible amount by ensuring the "horizontal volume" is small compared to the "vertical volume".

The spool valves 24, 34 could be replaced by motorised ball valves which can give good leakage and fluid transfer characteristics. Ball valves do not have an "energized" or "de-energized" state but are positively actuated into each state. A single five port ball valve may be fitted which would take the place of both three port valves and eliminate some pipework.

Isolation or shut-off valves 55 are incorporated at various points in the system to isolate sections for repair work. Valves 18a and 18b are also fitted in the calibration check points so that the calibration system can be connected to the couplings 57 and 57a and brought up to pressure before exposure to the reference head pressure. Such valves 18a, 18b should have very low fluid displacement so as not to affect the reference head when they are turned off, and ball valves are preferably used. An additional check point comprising a self-sealing, quick-release coupling 57b and a low displacement cock 18c enables the product tank pressure to be measured directly. The calibration check points can also be used to fill or drain the reference heads.

Vent pipes (not shown) can be fitted to the top of the reference heads and directed down to ground level to facilitate filling or draining the reference heads without removing the cover plates at the top. These are plastic pipes with removal plugs at the bottom.

What we claim is:

1. Apparatus suitable for use as a pressure standard, comprising a reference container arranged, in use, to have a predetermined orientation and to be charged with a liquid whereby the pressure at a port in the lower part of the container is at a predetermined value, and wherein the container is sealed at an upper part by a closure member having characteristics such that the space above the liquid within the container is isolated from the external environment while being maintained at a pressure substantially equal to the pressure of the external environment.

2. Apparatus according to claim 1, in which the container is so formed that its upper end which is sealed by the closure member includes portions which are directed substantially vertically downwardly.

3. Apparatus according to claim 1, in which the closure member is a variable volume device so arranged that the pressure within the space above the liquid and exerted on one side of the closure member from within the container is maintained substantially equal to the external pressure on the other side of the closure member.

4. Apparatus according to claim 1, in which the closure member is of a thin, flexible material.

5. Apparatus according to claim 4, in which the closure member is in the form of a floppy bag.

6. Apparatus according to claim 1, in which the closure member is enclosed within a rigid, protective container.

7. Apparatus according to claim 1 further comprising means for compensating for changes in the pressure at the port of the reference container due to changes in the volume of the reference container.

8. Apparatus according to claim 7, in which the said compensating means comprises a second container coupled to said port and arranged, in use, to contain liquid at substantially the same temperature as the liquid in the reference container, the volume of the second container being so arranged that an increase in the volume of the liquid contained therein due to thermal expansion of the said liquid is substantially equal to a fall in the level of the liquid in the reference container due to thermal expansion of the said reference container, which fall in level is substantially compensated by transfer of liquid from the second container to the reference container.

9. Apparatus suitable for use as a hydrostatic pressure standard comprising a reference container arranged, in use, to be mounted with a predetermined orientation and to be charged with a predetermined mass of liquid to provide a predetermined pressure head at a port at or near its lower end, and sealed at its open, upper end by a closure member having characteristics such that a change in the volume of the space within the container above the liquid does not substantially affect the pressure at said port.

10. A pressure monitoring system including:
a source of pressure to be monitored;
transducer means responsive to pressures within a range defined by a minimum pressure and a maximum pressure, said transducer means having a calibration curve and providing an output signal relating to the calibration curve;
pressure standard means for providing a standard of pressure at substantially one of the minimum pressure and the maximum pressure;
means for selectively coupling the transducer means to the pressure standard means and the source of pressure to be monitored; and
processing means responsive to the output signal of the transducer means when coupled to the pressure standard means and the source to provide an adjusted output signal representative of the pressure to be monitored.

11. The monitoring system as set forth in claim 10 wherein the source of pressure includes a liquid disposed in a tank and the processing means includes means for storing values representative of the internal dimensions of the tank and means responsive to the adjusted output signal to determine the mass of the liquid in the tank.

12. A system according to claim 11 further comprising means for determining the temperature of the liquid in the tank and for providing an electrical output dependent thereon to the processing means, said processing means bing arranged to compensate for changes in the temperature of the liquid from a predetermined value to correct for changes in the dimensions of the tank.

13. A system according to claim 12, wherein the data processing means includes multiplexing means arranged to couple the outputs of the temperature determining means and the transducer means in a predetermined sequence to the data-processing means.

14. A system according to claim 11, further comprising indicating means having an input coupled to an output of the processing means for providing an indication of the said pressure or said mass.

15. The monitoring system recited in claim 10 wherein the processing means provides a control signal for controlling operation of the selective coupling means.

16. A pressure monitoring system comprising:
a source of pressure to be monitored;
transducer means responsive to pressures within a range defined by a minimum pressure and a maximum pressure;
first means for providing a standard of pressure of substantially one of the minimum pressure and the maximum pressure;
a reference container included in the first means and having a port located near a lower end thereof and a closure member located near an upper end thereof, said container being adapted to be charged with a predetermined mass of a fluid and said closure member having properties such that a change in the pressure in the space above the fluid in the container does not affect the pressure at the port; and
second means for selectively coupling the transducer means to the first means for calibrating the transducer means at the one pressure and for coupling the transducer means to the source for determining the pressure to be monitored.

17. A pressure monitoring system comprising:
a source of pressure to be monitored;
transducer means responsive to pressures within a range defined by a minimum pressure and a maximum pressure;
first means for providing a standard of pressure of substantially the maximum pressure defining the range of the transducer means;
third means for selectively coupling the transducer means to the first means for calibrating the transducer means at the maximum pressure;

fourth means for selectively coupling the transducer means to the second means for calibrating the transducer means at the minimum pressure; and means for coupling the transducer means to the source for determining the pressure to be monitored.

18. A pressure monitoring system comprising:
a source of pressure to be monitored;
the source including a tank, a first liquid disposed within the tank and having a hydrostatic pressure to be monitored, and a first gas disposed within the tank above the first liquid in the tank;
transducer means responsive to pressures within a range defined by a minimum pressure and a maximum pressure;
first means for providing a standard of pressure of substantially one of the minimum pressure and the maximum pressure;
the first means including a reference container, a second liquid disposed within the reference container, and a second gas disposed within the reference container above the second liquid in the reference container;
second means coupled between the tank and the reference container for maintaining the pressure of the first gas substantially equal to the pressure of the second gas; and
third means for selectively coupling the transducer means to the first means for calibrating the transducer means at the one pressure and for coupling the transducer means to the source for determining the pressure to be monitored.

19. A system according to claim 18 in which the internal dimensions of the tank are known and the system further comprises means variable in accordance with the internal dimensions of the tank and the pressure of the liquid in the tank for providing an output signal having characteristics variable in accordance with the mass of the liquid in the tank.

20. The pressure monitoring system set forth in claim 18 wherein the second means includes:
flexible means disposed between the reference container and the tank for isolating the first gas from the second gas.

21. A pressure monitoring system including:
a source of pressure to be monitored, the source including a first liquid disposed in a tank and a first gas disposed above the first liquid in the tank;
transducer means responsive to pressures within a range defined by a minimum pressure and a maximum pressure, said transducer means having a calibration curve and providing an output signal relating to the calibration curve;
pressure standard means for providing a standard of pressure at substantially one of the minimum pressure and the maximum pressure, the pressure standard means including a reference container, a second liquid disposed within the reference container, a second gas disposed within the reference container, and means coupled between the tank and the reference container for maintaining the pressure of the first gas substantially equal to the pressure of the second gas;

means for selectively coupling the transducer means to pressure standard means and the source of pressure to be monitored; and processing means responsive to the output signal of the transducer means when coupled to the pressure standard means and the source to provide an adjusted output signal representive of the pressure to be monitored.

22. The monitoring system recited in claim 21 wherein the coupling means includes flexible means disposed between the reference container and the tank for isolating the first gas from the second gas.

23. A pressure monitoring system comprising:
a source of pressure to be monitored;
transducer means having a calibration curve and being responsive to pressures within a range defined by a minimum pressure and a maximum pressure;
first means for providing a standard of pressure of substantially one of the minimum pressure and the maximum pressure;
second means for selectively coupling the transducer means to the first means for calibrating the transducer means at the one pressure and for coupling the transducer means to the source for determining the pressure to be monitored; and
data processing means coupled to the transducer means for storing signals representative of the calibration curve of the transducer means for compensating for deviations of the output of the transducer means when the transducer means is coupled to the source for measurement of the pressure to be monitored.

24. A pressure monitoring system including:
a source of pressure to be monitored;
transducer means responsive to pressures within a range defined by a minimum pressure and a maximum pressure, said transducer means having a calibration curve and providing an output signal relating to the calibration curve;
pressure standard means for providing a standard of pressure at substantially one of the minimum pressure and the maximum pressure;
means for selectively coupling the transducer means to the pressure standard means and the source of pressure to be monitored;
processing means responsive to the output signal of the transducer means when coupled to the pressure standard means and the source to provide an adjusted output signal representative of the pressure to be monitored; and
means included in the processing means for storing values representative of the calibration curve of the transducer means, said processing means being responsive to the output signal of the transducer means when coupled to the pressure standard means for providing adjusted stored values of the calibration curve of the transducer means and being responsive to the transducer means when coupled to the source to select from among the adjusted stored values the adjusted output signal representative of the pressure to be monitored.

* * * * *